United States Patent
Wahi et al.

(10) Patent No.: US 10,061,859 B2
(45) Date of Patent: *Aug. 28, 2018

(54) COMPUTER IMPLEMENTED SYSTEMS AND METHODS FOR DYNAMIC AND HEURISTICALLY-GENERATED SEARCH RETURNS OF PARTICULAR RELEVANCE

(71) Applicant: TRUTEK CORP., Somerville, NJ (US)

(72) Inventors: Ashok Wahi, Basking Ridge, NJ (US); Aikta Wahi, Basking Ridge, NJ (US)

(73) Assignee: TRUTEK Corp., Somerville, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/470,894

(22) Filed: Mar. 27, 2017

(65) Prior Publication Data

US 2017/0212963 A1    Jul. 27, 2017
US 2017/0316107 A9    Nov. 2, 2017

Related U.S. Application Data

(60) Continuation of application No. 15/372,292, filed on Dec. 7, 2016, now abandoned, which is a division of
(Continued)

(51) Int. Cl.
*G06F 17/30* (2006.01)
*G06F 17/27* (2006.01)

(52) U.S. Cl.
CPC .... *G06F 17/30887* (2013.01); *G06F 17/2705* (2013.01); *G06F 17/30864* (2013.01); *G06F 17/30985* (2013.01)

(58) Field of Classification Search
CPC .......... G06F 17/30887; G06F 17/2705; G06F 17/30864; G06F 17/30867; G06F 17/30985
See application file for complete search history.

(56) References Cited

U.S. PATENT DOCUMENTS 7,181,438 B1    2/2007    Szabo
RE44,207 E      5/2013    Schneider
(Continued)

FOREIGN PATENT DOCUMENTS

EP    2 711 852 A1    3/2014

OTHER PUBLICATIONS

Vanveerdeghem, Stijn. Introduction to Regular Expressions for IPS; Dec. 14, 2010; Cisco Support Community Website: https://supportforums.cisco.com/t5/security-blogs/introduction-to-regular-expressions-for-ips/ba-p/3099523.*
(Continued)

*Primary Examiner* — Mark D Featherstone
*Assistant Examiner* — Diedra McQuitery
(74) *Attorney, Agent, or Firm* — Stanley H. Kremen

(57) ABSTRACT

A method of retrieval of items of particular relevance from a particular domain. A processor receives from a remote computing device a resource-identifying string that has a combination of a predefined notation and a resource-related sub-string. The processor uses the resource-identifying string to retrieve a subset of data items from within a data set, the subset of data items relating to a subset of resources within a set of resources available to be served by the particular domain over a distributed network. The processor uses the subset of data items to generate a list of the subset of resources and serves the list to the remote computing device.

13 Claims, 9 Drawing Sheets

Related U.S. Application Data application No. 15/148,980, filed on May 6, 2016, now Pat. No. 9,529,922.

(56) References Cited

U.S. PATENT DOCUMENTS

| | | | |
|---|---|---|---|
| 2005/0108554 A1 | 5/2005 | Rubin et al. | |
| 2005/0240999 A1 | 10/2005 | Rubin et al. | |
| 2010/0332493 A1* | 12/2010 | Haas | G06F 17/3064 707/759 |
| 2010/0332583 A1 | 12/2010 | Szabo | |
| 2013/0086098 A1* | 4/2013 | Lewak | G06F 17/30389 707/759 |
| 2016/0224631 A1* | 8/2016 | James | G06F 17/30507 |

OTHER PUBLICATIONS

Vanveerdeghem, Stijn. Introduction to Regular Expressions for IPS; Dec. 14, 2010; Cisco Support Community Website: https://supportforums.cisco.com/t5/security-blogs/introduction-to-regular-expressions-for-ips/ba-p/3099523 (Year: 2010).*

Lewey, Timothy, et.al., "A Framework for Reference Management in the Semantic Web".

Shahbaz, Muzammil, et.al., "Automatic generation of valid and invalid test data for string validation routines using web searches and regular expressions," Science of Computer Programming, 97 (2015) 405-425.

Naidu, V. Swami, et.al., "Robust Semantic Framework for web search engine," International Journal of Computer Trends and Technology—vol. 3, Issue 5—2012.

* cited by examiner

COMPUTER IMPLEMENTED SYSTEMS AND METHODS FOR DYNAMIC AND HEURISTICALLY-GENERATED SEARCH RETURNS OF PARTICULAR RELEVANCE

CROSS REFERENCE TO RELATED APPLICATIONS

This Present Application is a continuation of pending U.S. patent application Ser. No. 15/372,292 (the '292 Application) filed on Dec. 7, 2016, which in turn is a division of U.S. patent application Ser. No. 15/148,980 (the '980 Application) filed on May 6, 2016 that issued as U.S. Pat. No. 9,529,922 (the '922 Patent) on Dec. 27, 2016. The '980 Application, the '292 Application, and the '922 Patent are incorporated by reference herein in their entirety. This Present Application claims priority to both the '980 and '292 Applications.

FIELD OF THE INVENTION

This disclosure relates to the field of computer implemented searches and searching; more particularly, it relates to systems and methods for optimizing searches of databases, structured data or structured resources across a distributed network; more particularly, it relates to dynamic computer generation and display of data retrieved from a distributed network (either public or private) when a best approximate data district can be determined heuristically; it also relates to improving distributed network resource navigation and to improving the quality and efficiency of computer searches in discovering and displaying results of particular relevance.

BACKGROUND OF THE INVENTION

According to Wikipedia (2016), a heuristic is a technique designed for solving a problem more quickly when classic methods are too slow. A heuristic may also be advantageously employed to find an approximate solution when classic methods fail to find any exact solution. Thus a heuristic produces a solution in a reasonable time frame that is 'good enough' for the problem at hand. One way of achieving the kind of computational performance gain expected of a heuristic is just solving a simpler problem whose solution is also a solution (even if only approximate) to the initial problem. In computer searching, a heuristic acts to select branches (of the search) more likely to produce meaningful outcomes than other branches.

One of the continuing problems in computer searching (which is typically more sifting than searching) through vast amounts of data for relevant and useful data to retrieve is the sheer volume of 'hits' or returns possible on any given key word search. (According to the official Google blog, the number of unique URLs indexed by them passed the one trillion mark in 2008 and billions more pages have been added every day since then. Interestingly, they also say that "size of the web really depends on your definition of what's a useful page" and that there is therefore no exact answer.) Clearly, "useful" as a descriptor (like its cognate "meaningful") is determined almost solely by the person for whom the search is being conducted, and not by any scheme or combination of rankings and relevancy algorithms employed by a favorite search engine. The problem is that for many users, the results returned from a search are not only not terribly useful, they are downright useless.

Most current conventional search and retrieval is done on a key word or key phrase basis, and proprietary 'relevance' algorithms are employed to rank the retrieved resource URLs primarily in terms of number of occurrences of the searched-for term on the returned page, position of the term on that page, freshness of the results, quality of the website, age of the domain, and other like-metrics. There is equivocal discussion about whether things known as linkage or back-linkage contribute to relevance, but what appears to have wide agreement is that such cross-linking is related, if at all, only to topical relevance. In other words, key word and key phrase returns are really just 'voting' by the search engine.

It should be noted that Google and other major search engines use something called natural language processing or NLP (typically executed on a search engine server) which turns normal English questions or phrases entered in a browser into Boolean strings that are displayed, if at all, on the browser's address bar without further input by the user. It is for the most part all done invisibly to the eye of the user or querier. No computations are displayed. The point is that the user does not enter any Boolean terms, and generally does not have to do so.

So the question of whether 'relevance' as determined by a search engine can produce a particular relevance for a particular user is often a mystery not solved until the hundreds of pages of hits are presented for the user's own review. It may be the best that can be reasonably expected however from current search intelligence. What is needed, for at least some users or a class of users, is a way to heuristically skip the conventional keyword or key phrase tallying and associated relevance algorithm calculations, and go directly to resources already known to be both useful and of particular relevance to the user.

Reviewing selected aspects of computerized searching and resource acquisition, conventionally, a Uniform Resource Identifier (URI) is a string of characters used to locate and identify a specific resource on a network. There are two classifications of URIs: Uniform Resource Name (URN), which is simply a unique identifier for a particular resource; and Uniform Resource Locator (URL), which specifies the address (location, i.e. domain and or path) of a resource on a particular network (e.g., the World Wide Web), and occasionally also a means for retrieving that resource.

It may be useful to consider the following conventional example URI:
  http://example.com/city/
    development?name=building#electrical
in which: http:// (Hyper Text Transfer Protocol) is referred to as the scheme or protocol;
  example.com is referred to as the authority or domain.
  city/development is referred to as the path (within the identified domain) (all of the above sometimes also referred to collectively as the URL, though properly speaking, the sum of the above components is the URI).
  ?name=building is an optional so-called query portion of the URI.
  #electrical is an optional so-called fragment portion of the URI.
(See FIG. 1.)

According to the HTTP scheme, the domain is parsed from the URI by the client browser and, with reference to a DNS, the true domain is identified, and a session connection established. The path is passed to the connected domain server which uses the path to identify and navigate to a particular part of the storage managed by the server.

The optional fragment is separated from the domain and path (and from the query, if present) by a hash (#). The fragment contains a fragment identifier providing direction to an internal secondary location in the particular primary resource either identified by the preceding URI or found by the query, if present. When the primary resource is an HTML document, the fragment is typically an ID attribute of a specific element inside the primary resource or a section heading internal to the primary resource.

The fragment identifier functions differently than the rest of the URI: namely, its processing is exclusively client-side (browser-side) with no participation from (and no parsing by) the web server and it directs the client web browser to scroll this element or heading into view after the primary resource is returned by the server to the browser.

The optional query is typically separated from the domain and path by a question mark (?) and contains a query string of non-hierarchical data. Unlike fragments (preceded by the hash (#) mark), a query is seldom, if ever, parsed or acted upon by the client browser. The server at the connected domain, using conventional logic and parsing software generally well known to those skilled in the art, identifies and handles all queries and query parsing. Generally, the parsed query is then used by the server-side software, perhaps along with a server-side index of all data resources at the specified data location on the server, to create and return a list of all resources (for example, web pages) that match the elements of the query.

It is important to note that while queries can be a part of a URI, they are not input by users as part of the URI, but created by programming run on the client or on a server. Typically buttons clicked by a user or natural language entered on a search bar or a combination of those two and or other well known components cause client agents (browsers) to run code that creates the query component of the URI.

Generally, URIs must specify the protocol (the rules for the transmission of information) by which the communicating entities in the network abide. For example, HTTP is a client-server protocol by which a client, e.g., a web browser, exchanges messages (requests and responses) with hosting servers (e.g., "the Internet"). In a typical HTTP URI (e.g., https://www.nyu.edu), the browser (via DNS) resolves the domain name, nyu.edu, to an IP address which is a unique identifier for the server, and with which the browser intends to communicate. The URI:

https://www.nyu.edu/students.html refers more specifically to a location on this server, namely the resource at the "/students.html" address on the nyu.edu server.

Occasionally a computer user would like resources that are returned by the server to be processed in some way client-side (e.g., and continuing the above example, by the web browser on the client, and not by the server hosting the nyu.edu website). To this effect, URIs sometimes provide the hash mark fragment identifier (#). The hash mark, introduced at the end of a URL, typically identifies a portion of a primary document returned by the web server.

For example, if the URI in question is https://www.nyu.edu/students.html#awards, the web browser operates on the returned resource, the students.html document, to then bring to focus for the user the "awards" portion denoted in the students.html document.

THE DISCLOSURE AND SUMMARY OF THE INVENTION

Methods and systems for heuristically skipping the conventional keyword or key phrase tallying and associated relevance algorithm calculations, and going directly to resources already known to be both useful and of established relevance to particular users are disclosed.

The disclosed systems and methods specifically improve upon and refine URIs, so a review of some basics is presented to appreciate this improved resource return interchange.

Conventionally an inquiring researcher typically uses Google or some other major search engine to locate and retrieve information on topics of interest based on a guess as to some most appropriate choices of keywords for the topic or topics desired. Essentially a search query generates regular expression matches to generate millions of possible results very quickly. Alternatively, the user is required to articulate a relationship in more than just key words, hoping that the search engine will correctly (for the user) parse the relationship from the query and return something of interest. There is no navigating of relationships and no semantic web.

Disclosed systems however suggest a superior heuristic means for generating a more usable search return and for websites and other information storages to organize the semantics of their resources into a kind of relational web. Disclosed systems offer a simple means for a user searcher to direct retrieval of a resource list return based upon content providers' respective own understandings of their respective stored information resources, instead of a Google's best guess' at a key word-based information match to search expression.

For example, while the Google search "NYU engineering faculty" will return millions of results (2.96 million at last check), disclosed systems offer the means to produce a far more manageable, meaningful and beneficial list of perhaps only dozens of items, the contents of which are almost assured to be more useful by virtue of the leading authority on the subject of that content, the website host itself (i.e. NYU.edu), describing them as such.

The disclosed technology is not a "query" in the conventional sense. Queries are often part of a URI (conventionally set off from the URL portion of the URI by a ? symbol), but they are not directly input in that form by any user. Rather, they are created by programming run on the client or the server from other kinds and forms of input and machine parameters. Typically NLP query input and or buttons or the like clicked by a user cause client agents (browsers) to run code that creates a conventional query component in the URI. In sharp contrast, in this disclosure, resource retrieval is less a matter of query and trial and more a matter of simply directly retrieving ("getting") what is already known or at least suspected to be at a particular location. And, instead of query-type language, it is user-selected heuristic input that is used.

In a broad sense, disclosed systems provide a new interface to manage interactions between a particular resource-seeking URI and a computer or computer-implemented systems. The new interface enables a particular user to put a URI to work to discover, access, filter, perform inclusionary and exclusionary retrievals with user-selected heuristic input, and to present and display retrieval results that are immediately meaningful and beneficial to the user. "Heuristic input" can be accomplished in a number of ways.

One example is for the user to manually include directly in the URI (advantageously at the end of the path portion of the URI) a resource-identifying string generally having a both a predefined notation and a resource-related sub-string. In some embodiments, the predefined notation is also referred to as an Unique Identifier operator symbol and the resource-related sub-string can also be referred to as a resource identifier. Each resource-related sub-string or resource identifier includes at least a word or term that is not a key word for conventional query matching, but is rather a data collection positional referent, or a relational tag or heading corresponding to a like tag or heading in a data collection.

In simple and example terms (not intended to limit the scope of the disclosure), such heuristic input can desirably be a kind of short-cut designed for solving the search problem more quickly and more precisely than conventional search engine methods are believed to be capable. An example of such a heuristic short-cut is for the URI to be made to contain a direction to a select branch or branches (of all possible search branches), such branch or branches deemed more likely to produce meaningful outcomes than other branches, or than not selecting a branch at all. In this disclosure, these branches of possible search are also sometimes referred to as districts, or data districts.

Results can come from Internet server databases and data sets and also from local or other kinds of databases and data sets that are not accessible on the World Wide Web. A disclosed system improves and enhances utilization of computer resources and enables efficient and effective searches in the least number of steps with the greatest accuracy as per the user's intended search.

One aspect of this disclosure is a URI parser, itself associated in an otherwise conventional way with the client or browser, or optionally written in as a part of it. The disclosed parser is not limited to the current state-of-the-art conventions for client or browser parsing of URIs. For example, a user could type in:

http://www.domain.com ^ State Capitals ^ ^ Nebraska

Since a browser (together with any of its conventionally associated software now known or later developed) takes that URI and parses and processes it first, the (^) and (^ ^) operators and their respective resource identifiers (State Capitals and Nebraska) are parsed separately from the URL portion of the URI. The URL is parsed conventionally as described above and passed to the identified domain server (along with a specific path, if any) so that the server knows where, among all of its possible resource locations, to look for what comes next.

The server then processes the passed resource-identifying string and its, for example, ^ and ^ ^ operators and their respective resource identifier sub-strings in a unique and novel manner. Instead of treating the resource identifiers as mere key words, the server has been modified with executable instructions to recognize (or made to associate with executable instructions or software on the server that recognizes) the chosen operator symbols as introducing a different kind of request.

In this example, it is a request to identify and locate only those resources that are appropriately tagged or labeled or headed (or the like), whether as meta- or other kind of data, as "State Capital" resources, and to not include any such resources that are tagged or labeled or headed (or the like) as "Nebraska."

An alternate aspect of this disclosure is a URI parser, itself associated in an otherwise conventional way with the client or browser, or optionally written in as a part of it, that varies only from current state-of-the-art conventions for client or browser parsing of URIs in that it does not strip an unknown operator/resource identifier such as contained in the example, but instead passes it along to the identified domain server.

Servers (including domains, websites, and the like) participating in disclosed systems and methods have at least some of the following characteristics. At the instigation of the server authority, selected server information resources are tagged or labeled or headed (or the like) into a plurality of information districts. See FIG. 8.

An adjunct or participating server authority (that is, with respect to disclosed system or method) sets up its website to describe, or have described for it, these related "information districts" for each of its information resources. For example, metadata attached to NYU.edu/faculty describes the NYU.edu/faculty URL's position in the relational web that NYU.edu (or other interested parties who are granted this type of access) may define. For a further example, some appropriately labeled or tagged (or the like) resources located at NYU.edu/faculty may be dedicated to NYU Economics professors, others to NYU Engineering professors, or to NYU deans, or the like categories, and these resource pages themselves advantageously have similar attached or linked relational metadata for other related resources, and so on. In this way, a relational web is structured "underneath" each participating website, desirably underneath each page on the website, organizing it semantically, which is to say, relationally.

A Unique Identifier and its resource identifier string act as an operator to denote the referencing of these relationships directly inside the otherwise conventional URI string (for instance, in an otherwise conventional search bar).

Advantageously, such a URI search and retrieval request containing at least one Unique Identifier (also known herein as a predefined notation) and at least one associated resource identifier sub-string goes directly, without generalized keyword matching, to each and every page and or document at the stated URL location that is tagged or headed in some way with the same resource identifier and retrieves its URN into a list which is served back to the client or browser without also serving back any page or document URNs that might also contain matching terms (that is, matching in a general and conventional way the words of the resource identifier sub-string) but are not headed or tagged with that resource identifier.

Inclusion of resource identifiers by tagging or heading or the like in any given data or document collection so as to be responsive to special URIs in disclosed systems and methods is left to the server authority, but when so arranged by the server authority, it is believed that a high degree of efficacy can be obtained in so labeling and or heading primary categories of information deemed by the authority to be specially desirable to the population of users. Persons skilled in the art will appreciate that any such labeling or tagging or the like of resource identifiers may, in appropriate circumstances, also include tagging or labeling with machine readable tags both the beginning and the end of the information resource selected for tagging.

These systems and methods are distinguished from teachings that discuss known 'categorization' or 'topic' searches. Such teachings require a search engine to machine pre-categorize certain documents based on frequency of occurrence and proximity of certain words. Disclosed systems do not employ search engine machine pre-categorization. To the extent a server authority might employ a machine to assist in tagging, heading and the like for important information districts, the choice of label or tag is reserved to the authority, and not merely the outcome of a search engine determination of frequency and or proximity or the like criteria.

In other words, such previous teachings are really just a kind of specialized key word search, not significantly different from other key word searching discussed in this disclosure. Disclosed directed URI searching is a kind of direct retrieval request addressed to authority assigned tags and headings or the like.

Use of a Unique Identifier is disclosed for improving a user's capacity in otherwise conventional systems and browsers to describe with particularity a URL/URI set of resources already believed to be relevant that are then returned by the hosting server that is prepared for such a retrieval request. This Unique Identifier is desirably a keyboard generated symbol (or combination of such symbols) not now in use as part of conventional keyboard generated URI or URL strings.

In a one embodiment, the symbol HAT (the ^ symbol, or <shift>6 on most ASCII keyboards) operator is employed as the Unique Identifier which, when introduced at the end of a URL, prompts the assembly and return of items relevant to the resource identifier that follows the Unique Identifier in the URL/URI.

In the example employing the 'HAT' (^) operator as the Unique Identifier, use of a single 'HAT' (^) in front of a word or phrase in a resource identifier includes a district or sub-district related to the word in the search. Use of double 'HAT' (^ ^) in front of a word excludes that district from the search. A strategic use of series of single 'HAT' and or double 'HAT' and or a hybrid (combination) of both can further refine the search.

In the example of NYU.edu/faculty, users are able to query from NYU.edu those things which NYU has decided are most relevant. For example, to get resources selected by the NYU server authority as being of, or related to, 'faculty' one would simply append a 'HAT' (^) to the URL, as in NYU.edu^faculty. As suggested above, this prompts the host NYU.edu to return that list of 'faculty' relevant information.

'HAT' may be applied repeatedly, which achieves the effect of refining the retrieval request. For example, NYU.edu^faculty^engineering^mechanical returns a list comprised of relevant resources for NYU.edu, but only those that describe themselves as faculty being further relevant to the field of mechanical engineering.

'HAT' may also be applied repeatedly and in combination with double 'HAT'. For example, NYU.edu^alumni^mechanical^engineering^^PhD^^MS returns a list comprised of relevant resources for NYU.edu that describes themselves as alumni in mechanical engineering who have neither a Doctorate nor a Master's degree.

Thus the use of single or double 'HAT' notations to include or exclude certain accessible information districts is left to the discretion of the computer user for her intended need. In the above example, if the user is interested in excluding all PhDs but including all those with Master's degrees, then Master could have been easily prefixed with a single 'HAT' to precede the double 'HAT' notation prior to PhD, or vice versa. In this way, an end user may perform searches on websites by arranging a topic in a hierarchy of relations with 'HAT' notation, which describes to the hosting server a path for navigating its own self-district-described semantic and relational web.

'HAT' can also be used in major specialty search websites (appropriately modified or prepared as described herein) including Zillow.com, Amazon.com, eHarmony.com, and the like. Appending the 'HAT' operator to these search strings on these specialty websites can include or exclude certain server-side authority mandated districts and present refined and meaningful search results.

The relational infrastructure that disclosed systems encourage is fundamental for appropriate third party advertisement. A relational path to a resource that is denoted by appropriate metadata coordinated to selected Unique Identifiers well-describes suitable advertisement genres. Additionally, advertisements may be explicitly declared in the resources metadata alongside districts. Thus, NYU.edu/faculty may have attached to its metadata, alongside "engineering", "economics", and the like, a website specializing in engineering textbooks or economics textbooks.

Further examples of practicing disclosed systems and methods follow.

In one embodiment, a method of retrieval of items of particular relevance has the steps of constructing a resource identifying string that includes a combination of a non-conventional symbolic or coded operator and a resource identifier sub-string; using the string to retrieve a subset of data items from within a data set of data items (where the data set also contains items that are not relevant to the resource identifier sub-string). The operator is advantageously parsed as a logical function operator. In another embodiment the operator is created with a keyboard or other computer input device, The string can be a URL/URI string, and the operator generally precedes the resource identifier sub-string.

In an alternate embodiment, a client-side string parser generates a search engine appropriate search query formatted to a set of search standards appropriate to a particular data set within which the search engine is designed to operate. The query string can be a URL/URI string. In some instances, at least one Boolean operation is manually entered into the string but not as NLP, and it is not a Boolean query engine entry.

In at least some instances, the subset of data items is automatically returned. The subset of data items automatically returned is non-user-generated content, and or the subset of data items automatically returned is responsive (and desirably responsive only) to the resource identifying string (coded operator and sub-string) combination. In at least some instances, the operator and sub-string combination directs a content and or subject based search, and not a positional search, and the search engine query is directed to a data set organized at least in part as a semantic relational data set. In some instances the query string comprises at least two resource identifiers, each resource identifier preceded by at least one occurrence of the ^ and or the ^ ^ symbol.

Another method of serving a list of resources of particular relevance is also disclosed. The list of resources is served during a connection session between a processor and a remote computing device (RCD), where the connection is advantageously established over a distributed network such as the Internet or the World Wide Web. Desirably the processor is operatively connected to a particular server domain. The processor receives a resource-identifying string from the RCD, advantageously as part of a URI ordinating in a browser on the RCD. Persons skilled in the art will appreciate that as part of the browser's initial connection with the processor, the domain or authority portion of the URI is used to identify and connect with a particular unique domain, and operatively to a server having one or more processors. Thus the processor itself would not appear to be aware of the whole URI string, but rather only the part of the URI after the path (if any) portion of the string (the path portion itself having been received by the processor at the beginning of the connection session and used to navigate to the portion of the domain identified by the path).

The resource-identifying string is generally and advantageously a combination of a predefined notation and a resource-related sub-string. It is the resource-identifying string that contains the string reference(s) (in the resource-related sub-string) to the headings or tags (or the like) in or on or related to the documents and other resources on the particular domain that the RCD wants to retrieve. In simple (but not reductive) terms, this is a request for a list of particular resources (documents, files and the like) to be compiled and sent back to the RCD from that place or those places in storage connected to the processor on the selected domain that have been previously identified with those headings or tags either directly in or on or attached somehow to those documents, or stored relationally in a data set or data structure related to those documents.

The resource-identifying string is not necessarily a unique ID for a single resource or document (though in some instances it may turn out to be). More commonly this string is used to identify one or more resources of interest to the RCD. This string could also therefore be referred to as a "resource-relating string."

The predefined notation portion of the resource-identifying string is advantageously the HAT ^ symbol or any other symbol or sequence of symbols used generally as a logical operator with reference to the content of the resource-related sub-string. The predefined notation desirably precedes the resource-related sub-string within the resource-identifying string. However, persons skilled in the art are believed to be able to devise alternate arrangements of the parts of the resource-identifying string without departing from the scope of the claims.

The notation is predefined in the sense that in any embodiment of the disclosed technology, the operative notation or symbol has already been determined. It is not absolutely necessary, in possible various embodiments of the technology, that a single predefined notation be used around the globe, though it is believed that global agreement is advantageous. In any embodiment of the technology, it is believed that a consortium of users (user/owners of various RCD) and domain authorities (public and commercial institutions and the like) will have agreed in advance on the nature and specifications of the predefined notation. Alternatively, the predefined notation is determined by a single entity and promulgated world-wide for consideration and use by others. In nearly every case, the subset of resources represented by the list is less than the whole set of resources which are related to all the data items within the data set.

In any event, once the predefined notation has been adopted, special server software available in a conventional manner to the processor parses the resource-identifying string using the predefined notation (most often used as a logical operator) in combination with the resource-relating substring to match one or more of the resource-identifying strings to codes related to or tagged onto resources available at the particular domain (and at the particular path, if one has been specified in the URL portion of the URI from the RCD). Resources containing or related to such matched resource-identifying strings are then listed and or served directly over the distributed network.

For clarity, it should be noted that the predefined notation is sent by the client browser on the RCD directly, if possible, as the notation symbol(s) is input to the RCD browser on the address line of the browser (for example directly typing on a keyboard the ^ symbol as part of a keyboard entered URI on the address line of the browser). If a direct send of the notation symbol(s) is not possible, a well-known equivalent of the symbol is sent instead. For example, the ^ symbol, though readily entered from a standard QWERTY keyboard, is not normally sent directly as that symbol, but rather as the hexadecimal equivalent, preceded by the % sign operator that tells the server that what follows is a hex equivalent. In the case of the ^ symbol the hex equivalent is 5e; so, the ^ symbol is sent to the server as %5e.

The resource-related sub-string portion of the resource-identifying string, as noted earlier herein, contains text and or symbol and or combinations of text and symbol in strings that are intended to match, or otherwise be related to, headings and tags (and the like) on or in documents and resources located in storage at the end of the specified URI path, or in a data set or data structure that contains fields or other entries that are relationally connected to such documents and resources. It is believed that persons skilled in the art will know the many ways and methods for setting up such heading and tagging in documents in storage and or setting up such data set relations with such resources, and no further discussion is required of these points.

It is to be noted that, unlike many aspects of client-server interaction, especially in the area of furthering and managing conventional key-word search engine requests, the resource-identifying string is not created using executable instructions previously served by the processor to the RCD during the particular connection session. Also, unlike the case where a NLP search request is entered on a browser search bar and the executable instructions in or associated (such as by pre-selecting a preferred search engine) with the browser translate and or reformat the NLP request into something that can be sent out across the Internet, the resource-identifying string is directly entered and not created by executable instructions running on the RCD.

While RCD browsers do presently translate non-ASCII codes, such as ^, into different form, such as %5E, this is not an example of the kind of executable instructions referred to above. Neither is reception of keyboard (or other) input by the RCD or RCD browser to be interpreted as created by executable instructions. In such instances, it is believed that such input is merely BIOS keyboard recognition.

After the processor receives the resource-identifying string, the processor uses it to retrieve a subset of data items from within a data set. Within the art, "data set" can refer to a very specific data structure (See https://en.wikipedia.orq/wiki/Data_set). But in this disclosure, "data set" is also used in its more general, mathematical sense as basically any set of data. This can for example be a database and it can also be a set of tags and headings (and the like) residing and collectively stored in a set of documents or other resources.

The subset of data items generally relates to a subset of resources within a set of resources available to be served by the particular domain over the distributed network. The data set and the set of resources respectively reside within one or more computer-readable memory operatively connected to the processor.

The processor then uses the retrieved subset of data items to generate a list of the subset of resources, and serves the list to the RCD over the distributed network. In the special case that the subset of resources generated by the subset of data items is only a single resource (or, selectively, a number of resources less than five, as an example small number), the processor is selectively programmed not to perform generating and then serving to the RCD list of the subset of resources, but instead serves the single resource (or a selectively small number of resources) directly over the distributed network to the RCD.

Again, as noted above, in nearly every case, the subset of resources represented by the list is less than the whole set of resources which are related to all the data items within the data set.

The data items are contained within the data structure (all of which is stored in or resides within the one or more computer-readable memory), and the data structure can (by way of non-limiting example) be a database, a container, an array, a list, a stack, a queue, a tree, a graph, a map or a hash, or the like structures now known or later developed.

The data items are desirably text strings contained within one or more documents residing within the one or more computer-readable memory, and the one or more documents can (by way of non-limiting example) be searchable PDF documents, word processing documents, HTML documents and XML documents, or the like document structures now known or later developed.

The data items can also be string data elements that can be (again, by way of non-limiting example) HTML elements, HTML tags, HTML element content, HTML tag content, XML elements, XML tags, XML element content, XML tag content, or XML document type definitions (DTD), or the like elements now known or later developed.

In the disclosed methodology, the resource-identifying string is advantageously received by the processor within an HTTP Get request, and desirably within a first Get request of the connection session.

In a variant example of the disclosed method of serving a list of resources of particular relevance, the processor expressly employs a string parser. The string parser itself can be known or novel, and be an integral part of the executable instructions run by the processor, or can be an adjunct set of such instructions called at appropriate times by the processor, in well-known subroutine fashion. The string parser in this variant method parses a string received by the processor from the RCD to determine whether the string is a resource-identifying string (see above for further discussion). If it is a resource-identifying string (as defined above), the processor conducts a data search (or alternatively the processor has an alternate set of instructions executed which may or may not be run on the same processor, all as will be appreciated by persons skilled in the art) within the particular domain (i.e. the domain of the server on which the processor runs), using the predefined notation and the resource-related sub-string as described above.

The data search is formatted by the processor to a set of search standards appropriate to both the contents of the resource-identifying string and to the possibly unique arrangement of data items within the data set itself on any particular server. This step allows a range of diverse data storages and structures on a range of diverse server memory systems to make use of the disclosed technology without having to convert such structures entirely to a single uniform standard. Each server authority will know how best to integrate such a string parser and search formatter into their system in order to take advantage of the disclosed technology, and it is believed that creation, execution and maintenance of such a parser and its search formatter will be within the knowledge of those skilled in the art and available to the server authority, given the particulars of this disclosure.

In the disclosed methods, the predefined notation is advantageously at least one occurrence of a text string, such as the ^ symbol, the ASCII decimal equivalent of the ^ symbol, the ASCII hexadecimal equivalent of the ^ symbol, or the HTML number equivalent of the ^ symbol. In some cases a single occurrence of the text string (such as ^) is used, and the single occurrence is used by the processor as a logical inclusive (all occurrences that meet the requirements of the resource identifier are returned) when retrieving the subset of data items from within the data set. In other cases, a plurality of occurrences of the text string are used (see single ^and double ^ ^ examples above). When a double occurrence of the text string is used, it is used by the processor as a logical exclusive when retrieving the subset of data items from within the data set. In addition to whatever other definitions and understanding of the term logical exclusive exist, in this disclosure the term is also intended to mean no occurrences that meet the requirements of the resource identifier are to be returned.

The above are merely possible examples of use of single and double occurrences, and logical operations assigned here by way of example could just as well be reversed in practice without departing from the scope of this disclosure. In addition other logical operations and combinations of logical operations can be assigned to any predefined notation in addition to or instead of exclusive or inclusive operations, as such operations will be appreciated by those skilled in the art.

In some instances the resource-identifying string two or more resource-related sub-strings, with each resource-related sub-string preceded by at least one occurrence of the text string (see example above).

Another embodiment is a method of retrieving a list of resources of particular relevance by a client-side computing device. The list is retrieved over a distributed network during a connection session between the computing device and a remote processor operatively connected to a particular domain. The resources are available to be served by the remote processor at the particular domain over the distributed network.

In this client-side embodiment, the computing device employs a string parser. The string parser itself can be known or novel, and be an integral part of the executable instructions run by the computing device, or can be an adjunct set of such instructions called at appropriate times by the computing device, in well-known subroutine fashion. The string parser in this method parses a URI string received by the computing device to determine if the URI contains a resource-identifying string. If the URI contains a resource-identifying string (as defined elsewhere above), the resource-identifying string is sent to the remote processor after the URL portion of the URI establishes a connection session with the particular domain via HTTP. In at least some instances the resource-identifying string is sent by the computing device to the remote processor within an HTTP Get request. The computing device then receives from the remote processor a list of one or more resources, the one or more resources being a subset of a set of resources available to be served by the particular domain over the distributed network.

The method contemplates the resource-identifying string being received as input to a conventional address bar within a distributed network browsing application executing on the computing device, where the address bar is conventionally displayed through a video interface. However, it is also contemplated that all manner of input devices, both now known or later developed, can be employed to input the URI and or the resource-identifying string to the browser address bar.

Further alternate embodiments include a system for serving over a distributed network, during a connection session between a processor operatively connected to a particular domain on the network and a remote computing device, a list of resources of particular relevance. In the system, the processor is operatively connected to one or more computer-readable memory, and the one or more computer-readable memory includes at the least a data set of data items, the data items relating to a set of resources, the set of resources being available to be served by the particular domain over the distributed network.

The processor is operatively configured to execute instructions to:
(1) receive from a remote computing device a resource-identifying string, the resource-identifying string comprising a combination of a predefined notation and a resource-related sub-string, where the resource-identifying string has not been created using executable instructions previously served to the remote computing device during the connection session and the resource-identifying string has not been created by executable instructions running on the remote computing device;
(2) retrieve, using the resource-identifying string, a subset of data items from within the data set, the subset of data items relating to a subset of resources within the set of resources available to be served by the particular domain over the distributed network;
(3) generate a list of the subset of resources, and
(4) serve the list to the remote computing device over the distributed network.

It may be helpful, in terms of the disclosed subset of data items from within the larger set of data in the data structure and the disclosed subset of resources from within the larger set of resources that are available at the particular domain to be served, to consider an example illustration. Consider a card catalog in a library with at least one set of the cards subject matter indexed and annotated with Dewey Decimal System numbers. The books in this library however are not ordered by the Dewey system, but by the Library of Congress system (e.g. shelved alphabetically by author). In this example the Dewey Decimal number on a particular card matches an identical Dewey number tag on at least one book, and thus points a library patron to where the book is located. (It has been said that a link like this is like having a string attached from the card to the book that leads you to it.)

In this example, the data set (the whole card catalog) is not the same entity as the resource set (the whole library). The subset of data items (a particular card or cards) within the data set are pointers (links), and not the subset of resources (one or a small number of books) themselves. To extend this example in the direction of claimed subject matter, the resource-related string (containing text strings intended to or suspected to match like text strings in a few cards in the card catalog at the particular library) is used by the processor to find the card(s) and then create a list of those cards (which list includes appropriate links, or pieces of string, to the books themselves). In this example, as in the material of this disclosure, the processor does not seek all the cards and or all the books; but rather only a select few of the cards, leading to a select few of the books in the whole library.

In a variant of this example, where there is no card catalog, but merely an array of books, the data set is the same entity as the resource set (the whole library). The subset of data items (particular books with the same Dewey Decimal number) within the data set are the subset of resources (one or a small number of books) themselves.

Another embodiment is a system for serving over a distributed network, during a connection session between a processor operatively connected to a particular domain on the network and a remote computing device, a list of resources of particular relevance. In the system, the processor is operatively connected to one or more computer-readable memory, and the one or more computer-readable memory includes at the least a data set of data items, the data items relating to a set of resources, the set of resources being available to be served by the particular domain over the distributed network.

The system includes a data structure residing in the one or more computer-readable memory, and the data structure has data items. The data items relate to a set of resources, the set of resources being available to be served by the particular domain over the distributed network.

The processor is operatively configured to execute instructions to:
(1) establish a connection to a remote computing device over the distributed network;
(2) receive and parse a string from the remote computing device;
(3) determine whether the string comprises a resource-identifying string, where the resource-identifying string comprises a combination of a predefined notation, and a resource-related sub-string, and wherein the resource-identifying string has not been created using executable instructions previously served by the processor to the remote computing device during the connection session, and the resource-identifying string has not been created by executable instructions running on the remote computing device.

If the string contains a resource-identifying string, the processor is further configured to execute instructions to:
(4) execute a data search within the particular domain by the processor, using the predefined notation and the resource-related sub-string, the data search being formatted to a set of search standards appropriate to the resource-identifying string and to the data set;
(5) retrieve, using the resource-identifying string, a subset of data items from within the data set, the subset of data items relating to a subset of resources within the set of resources available to be served by the particular domain over the distributed network;
(6) generate a list of the subset of resources; and
(7) serve the list to the remote computing device over the distributed network.

Another embodiment is a system for retrieving over a distributed network during a connection session between a computing device and a remote processor operatively connected to a particular domain, a list of resources of particular relevance, the resources being available to be served by the particular domain over the distributed network. The computing device includes a processor, a network interface operatively connected to a distributed network, an input interface, and a video display interface. The remote processor is operatively connected to a server operatively connected to the distributed network, and also operatively connected to a set of resources available to be served by the particular domain over the distributed network.

The computing device processor being configured to execute instructions to:
(1) parse a resource-identifying string comprised within a Uniform Resource Identifier (URI), the resource-identifying string having a predefined notation, and a resource related sub-string, where the resource-identifying string has not been created using executable instructions previously served to the computing device by the server during the connection session, nor has the resource identifying string been created by executable instructions running on the computing device;
(2) send the resource-identifying string to the server, and
(3) receive from the server a list of one or more resources, the one or more resources being a subset of the set of resources available to be served by the particular domain over the distributed network.

In all embodiments a solution is presented to the significant Internet and computer related problem addressed, described and discussed elsewhere above. Namely, since the matching algorithms in a conventional search (e.g. Google) are not particular to any given user, it is nearly always the case that any listing of relevant items is returned (if at all) amongst a plethora listing of irrelevant items. A solution to this problem, for the case where the user knows or at least suspects where the desired resources are located (e.g. somewhere on the Web and at least the particular domain, if not also the correct path within the particular domain, of that location), is to go directly to that domain and path and ask for a return of a listing of the relevant items located there. In this case, the domain authority or resource provider also knows where those particular resources are located and has marked them accordingly, in anticipation of this kind of direct request.

So, by causing a browser address bar (or the equivalent entry space in a local or private distributed network) to be loaded with the novel combination of a predefined notation and resource-identify string, a user seeking particular resources from a particular domain can quickly receive a listing of those resources (conventionally including conventional URI links for retrieving the actual resources themselves) without a plethora of irrelevant items appearing in the listing to obscure the relevant ones.

DETAILED DESCRIPTION OF THE INVENTION

Figure 1:
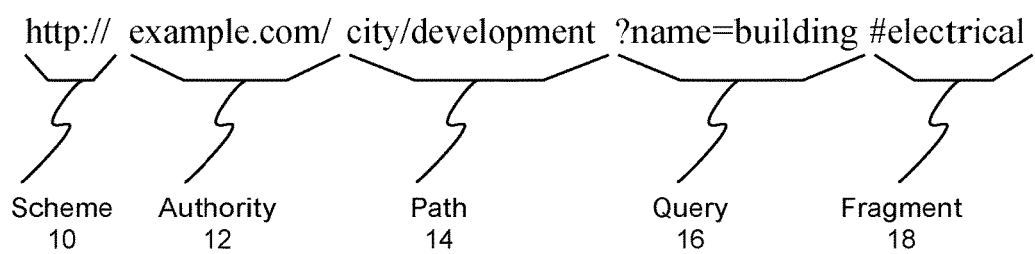
FIG. 1 is a schematic illustration of a conventional URL/URI string.

The following definitions are applicable in this disclosure.

Distributed Network/Public Network

A "distributed network" or "distributed computer network" is said to be distributed when the computer programming and/or the data to be accessed are spread out across more than one computer. When used in conjunction with "network", the term "public" is intended to imply that the user's access to the network is not controlled by or limited to a particular business entity or group of business entities. Likewise, the term "distributed" implies that processing capabilities and services are advantageously spread out among different nodes of the network with different nodes providing different services, as opposed to being centralized within a single host, server or LAN. In general, however, the system and method can be used on any type of distributed network over which online services are provided by web site owners to browsing users, including both public and private, and hybrid public-private networks.

Site/Web Site

As used in this document, the terms "site" and "web site" are both used to connote a node on a distributed network. A site may be serviced by more than one physical (web-type) server running web serving applications. Indeed, a site may be located in more than one physical location. Usually sites are made up of more than one web page, but not necessarily so. For the purposes of this application a site is the entirety of the cohesive presence of a service provider on a distributed network, such as the Internet.

Web Page

A "web page" is a discrete document or file served to a browsing user for display and interaction over a distributed network. The document is sometimes accompanied by interactive scripting languages such as JavaScript, ASP, JSP or the like. The web pages referenced in this document are generally dynamic pages with content that can change each time they are accessed. The scripts embedded in or accessed by the web page generally run functions on the serving web server or the receiving computing device and are capable of returning data.

Data Structure

Data structure is the physical layout of data. Data fields, memo fields, fixed length fields, variable length fields, records, word processing documents, spreadsheets, data files, database files and indices are all examples of data structures.

Data Set

Data set is a grouping of data contained on a specific resource on a network. A "list of resources" refers to notation of specific groupings of data related to a data set.

Data Item

Data item is a particular datum contained within a data structure or a data set. A "subset of data items" refers to a "subset of resources" within a "set of resources" residing in the memory of a processor and available to be served by the processor over the distributed network.

Component

As used herein, the term "component" is intended to refer to programming logic that may be employed to obtain a desired outcome. The term component may be synonymous with "module" or "agent" and may refer to programming logic that may be embodied in hardware or firmware, or in a collection of software instructions, possibly having entry and exit points, written in a programming, markup or scripting language, such as, for example, C++, HTML or PHP.

Domain

Domain is a realm of administrative autonomy, authority, or control on the Internet or on an Intranet.

Embodiment

Reference in the specification to "one embodiment" or "an embodiment" means that a particular feature, structure, or characteristic described in connection with the embodiment is included in at least one embodiment. The appearances of the phrase "in one embodiment" in various places in the specification do not necessarily all refer to the same embodiment, but they may. The phrase "A/B" means "A or B". The phrase "A and/or B" means "(A), (B), or (A and B)". The phrase "at least one of A, B, and C" means "(A), (B), (C), (A and B), (A and C), (B and C) or (A, B and C)". The phrase "(A) B" means "(A B) or (B)", that is "A" is optional.

Network Devices

Reference in the specification to a "digital device" or the like means that a particular feature, structure, or characteristic, namely device operable programmability or the ability for the device to be configured to perform designated functions, is included in at least one embodiment of the digital device as used herein. Typically, digital devices may include general and/or special purpose computing devices, such as a laptop computer, a personal digital assistant (PDA), mobile phone, and/or console suitably configured for practicing the present invention in accordance with at least one embodiment. The terms "client device" and "host device" are often synonymously used herein and are interchangeable with digital device as previously defined. Reference in the specification to "remote device" means a network device electronically coupled to the digital device or host platform via a network interface and suitably configured for practicing the present invention in accordance with at least one embodiment. Exemplary network devices may include general and/or special purpose computing devices, such as a network access policy decision point (PDP), a Policy Enforcement Point (PEP), a gateway, a router, a bridge, a switch, a hub, a repeater, and/or a server.

Network System

In various embodiments, a source and/or a destination may include a variety of equipment, terminals, networks, etc. In an embodiment, the source and/or destination may include one or more voice and/or data networks such as, but not limited to, a private branch exchange, a public switched telephone network (PSTN), integrated services digital network (ISDN), and/or a computer network (e.g., local area network (LAN), wide area network (WAN), metropolitan area network (MAN), personal area network (PAN), Internet, etc.).

Storage Medium

A storage medium includes any tangible mechanism that provides (i.e., stores and/or transmits) information in a form readable by a machine (e.g., a computer). For example, a storage medium includes, but is not limited to, read only memory (ROM), random access memory (RAM), magnetic disk storage media, optical storage media and flash memory devices, and like, now known or later developed.

Client

In the context of a distributed network, such as the internet, the term "client" should be broadly construed to mean any computer or component thereof directly or indirectly connected or connectable in any known or later-developed manner to a distributed computer network, such as the Internet. The term "client" includes reference to a "remote computing device (RCD)."

Server

In the context of a distributed network, such as the internet, the term "server" should be broadly construed to mean a computer, computer platform, an adjunct to a computer or platform, or any component thereof which provides resources over the distributed network. The term "server" includes reference to a "processor."

Uniform Resource Identifier

Uniform Resource Identifier (URI) is a string of characters used to locate and identify a specific resource on a network. See FIG. 4. It may comprise a scheme (e.g., HTTP), an identified domain (e.g., StateUniversity.edu, which may be preceded by "www"), and a path (e.g., SchEngr). It must include a "resource identifying string." An example of a URI (from FIG. 4) would be:

http://StateUniversity.edu/SchEng^faculty^^phd.

Resource-related Sub-string

Resource-related sub-string is a text string that refers to a subset of data to be searched within a data set.

Predefined Notation

Predefined notation is a set of logical operators. Logical operators can be used to initiate a Boolean search.

Resource Identifying String

Figure 4:
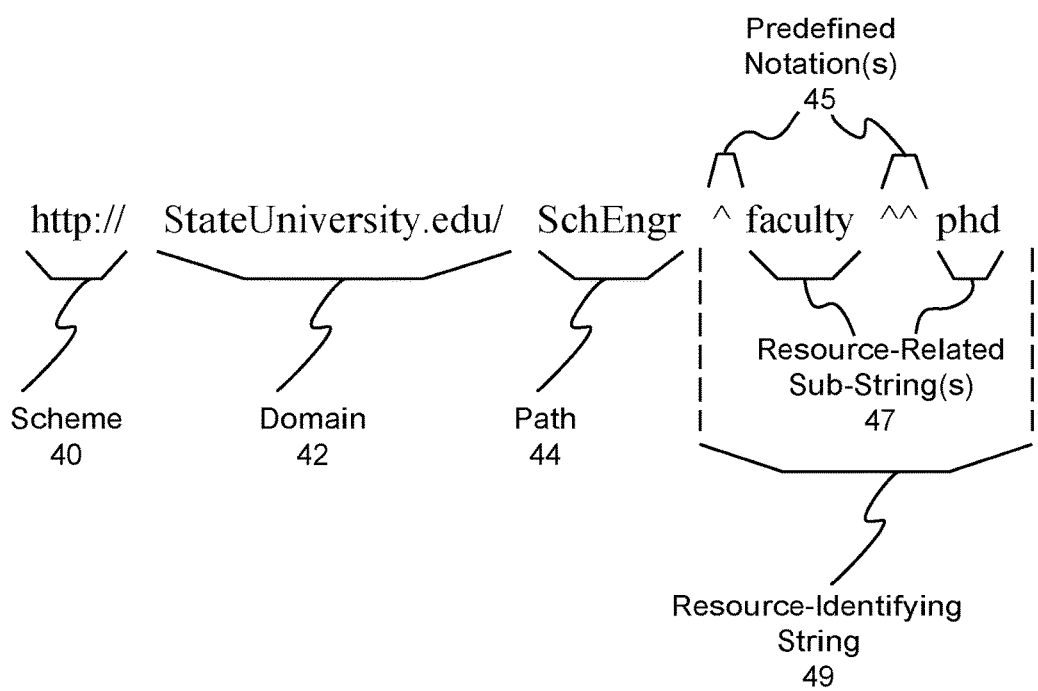
FIG. 4 is a schematic illustration of a disclosed URL/URI string embodiment.

Resource identifying string comprises a predefined notation and a resource related substring. In FIG. 4, the resource-related sub-strings comprise the words "faculty" and "phd." The predefined notations are "^" and "^^."

Document

As used herein, a document is computer data that contains searchable text strings.

Created Automatically

Created automatically as used herein means created using previously submitted computer executable instructions.

Various examples of the disclosed systems and methods are now discussed with reference to the drawings, wherein like numbers refer to like parts.

In FIG. 1, (conventional) scheme 10 is the protocol (in this case HTTP) by which the URI is to be sent and parsed by authority or domain 12. Path 14 is the location within domain 12 that is the locus of information relating to the URI. Optional query 16 contains arguments to be processed on the authority server, and optional fragment 18 contains arguments to be processed on the client device or browser after the return of information resources from the server in response to the URI and its optional query.

Figure 2:
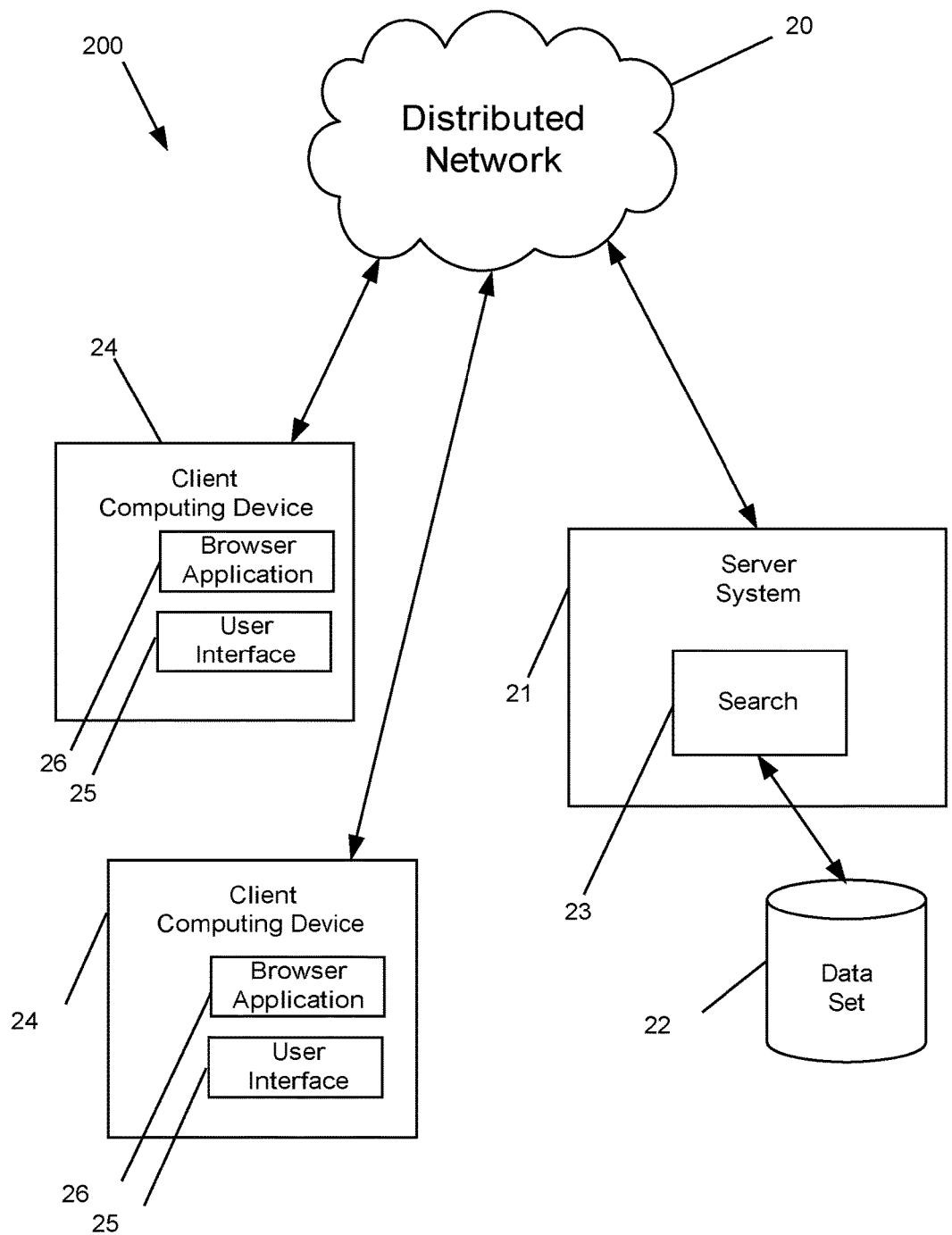
FIG. 2 schematically illustrates a generalized computing environment in which aspects of disclosed systems and methods are implemented.

FIG. 2 illustrates a client/server interface 200 over distributed network 20. Browser application 26 is in use on client computing device 24. User interface 25 allows a user to operatively interact with client computing device 24 and send requests to server computing device 21 through distributed network 20. Dataset 22 resides on server computing device 21 which operatively interfaces via a processor (not shown) with search and match application 23. Application 23 and dataset 22 operate, either together or individually, to generate data for inclusion in a response to the request sent by client computing device 24. This system desirably provides, at least in part, for the accomplishment of the process flowcharted in FIG. 6.

Figure 3:
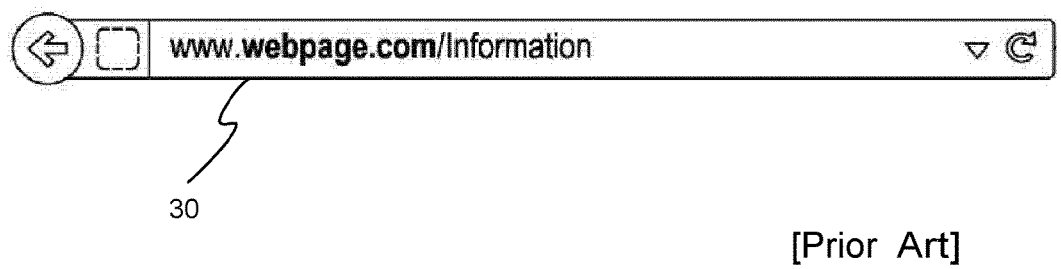
FIG. 3 is a schematic illustration of a conventional URL/URI string inside a browser input object.

In FIG. 3 a schematic URL/URI string is shown inside a conventional browser input object 30 such as a browser address bar.

In FIG. 4 scheme 40 is the protocol (again, in this case HTTP) by which the URI illustrated is to be sent and parsed by domain 42 along path 44. Resource-identifying string 49 comprised of predefined notations, operators 45 precede resource-related sub-strings 47. When parsed each operator determines what to do with its associated sub-string. For instance the single ^ interpreted as a logical operator can mean include, or include only, those tagged or headed documents that are labeled with the sub-string "faculty" following the ^. The double ^ ^ means to exclude any of the previously identified resources if they are also tagged or headed with the sub-string "PhD" following the ^ ^.

In like manner, and in keeping with previous discussion herein, the respective sub-strings may instead be used on data items within a data structure such as a database (or card catalog) to find, not the resources (books) themselves, but the data items that link to particular resources (books). Or we can readily substitute documents, such as HTML documents in this example for the example notation of 'books'.

Figure 5:
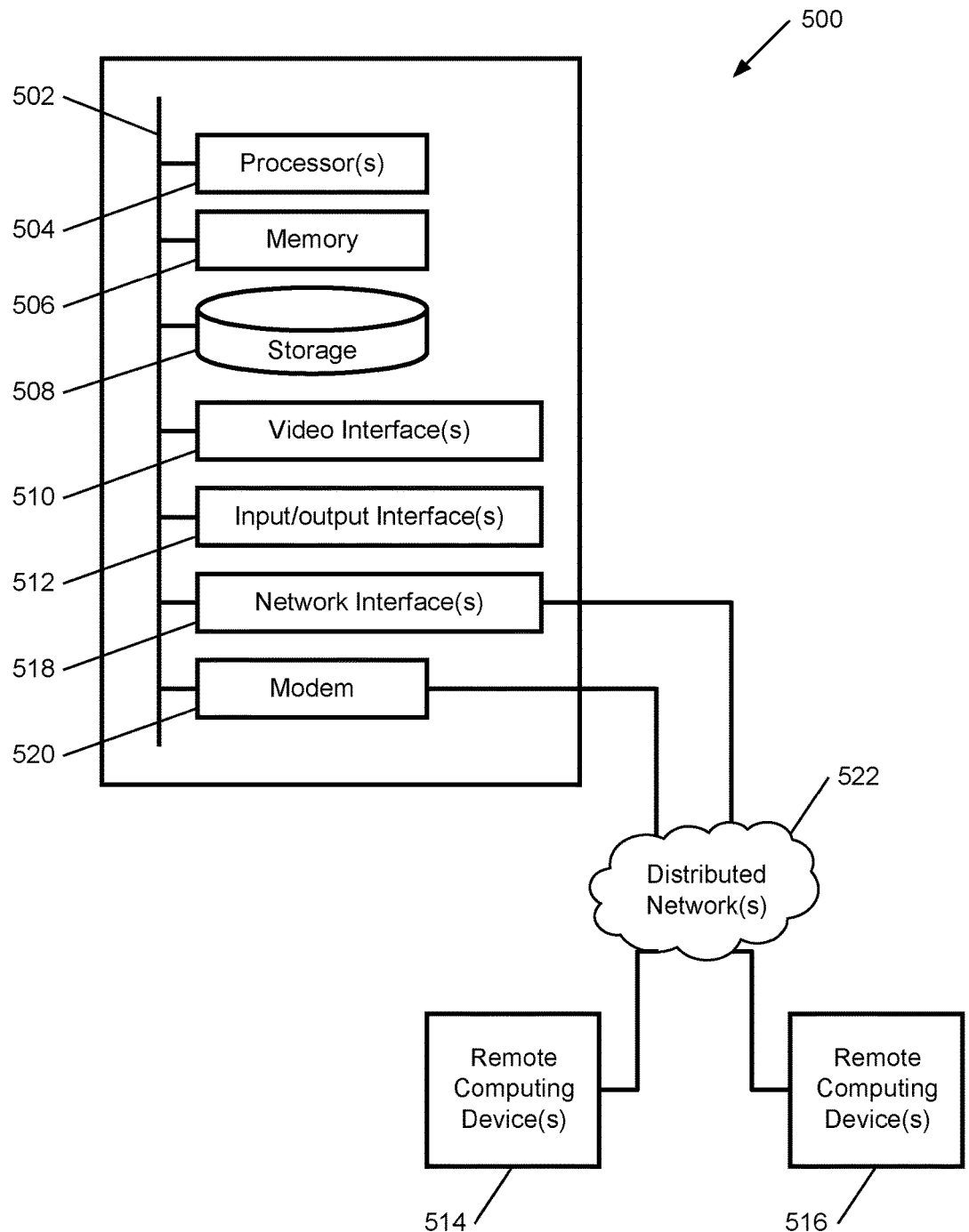
FIG. 5 schematically illustrates an alternate generalized computing environment in which aspects of disclosed systems and methods are implemented.

FIG. 5 and the following discussion are intended to provide brief, general description of a suitable environment in which certain aspects of the claims may be implemented. As used herein, the term "machine" is intended to broadly encompass a single machine, or a system of communicatively coupled machines or devices operating together. Exemplary machines include computing devices such as personal computers, workstations, servers, portable computers, handheld devices (e.g. Personal Digital Assistants or PDAs), telephones, tablets, and the like now known or later developed, as well as devices on modes of transportation, such as private or public transportation (e.g. automobiles, trains, cabs).

Typically, the environment includes a machine 500 that includes a system bus 502 to which is attached one or more single or multiple-core processors 504, a memory 506 (e.g. random access memory or RAM, read-only memory or ROM, or other state preserving media), other storage devices 508, a video interface 510, and input/output interface ports 512. The machine may be controlled, at least in part, by input from conventional input devices, such as keyboards, mice and the like as well as by directives received from another machine, interaction with a virtual reality (VR) environment, biometric feedback, or other input source or signal now known or later developed.

The machine may include embedded controllers, such as programmable or non-programmable logic devices or arrays, Application Specific Integrated Circuits, embedded computers, smart cards, and the like. The machine may utilize one or more connections to one or more remote machines 514, 516, such as through a network interface 518, modem 520 or like communicative coupling devices now known or later developed. Machines may be interconnected by way of a physical and/or logical network 522, such as via an intranet, the Internet, local area networks, and wide area networks. Persons skilled in the art will appreciate that communication with network 522 may utilize various wired and/or wireless short range or long range carriers and protocols, including radio frequency (RF), satellite, microwave, IEEE 802.11, Bluetooth, optical, infrared, cable, laser, and the like, now known or later developed.

Disclosed systems and methods may be described by reference to or in conjunction with associated data such as functions, procedures, data structures, application programs and the like, which when accessed by a machine results in the machine performing tasks or defining abstract data types or low-level hardware contexts. Associated data may be stored in, for example, volatile and/or non-volatile memory 506, or in storage devices 508 and/or associated storage media, including conventional hard-drives, floppy-disks, optical storage, tapes, flash memory, memory sticks, digital video disks, as well as more exotic media such as machine-accessible biological state preserving storage. Associated data may be delivered over transmission environments, including network 522, in the form of packets, serial data, parallel data, propagated signals or the like, and may be used in a compressed or encrypted format. Associated data may be used in a distributed environment, and stored locally and/or remotely for access by single or multi-processor machines. Associated data may be used by or in conjunction with embedded controllers; hence in the claims that follow, the term logic is sometimes intended to refer generally to possible combinations of associated data and/or embedded controllers. It will also be appreciated that remote machines 514, 516 may be configured like machine 500, and therefore include many or all of the elements discussed for machine 500.

Figure 6:
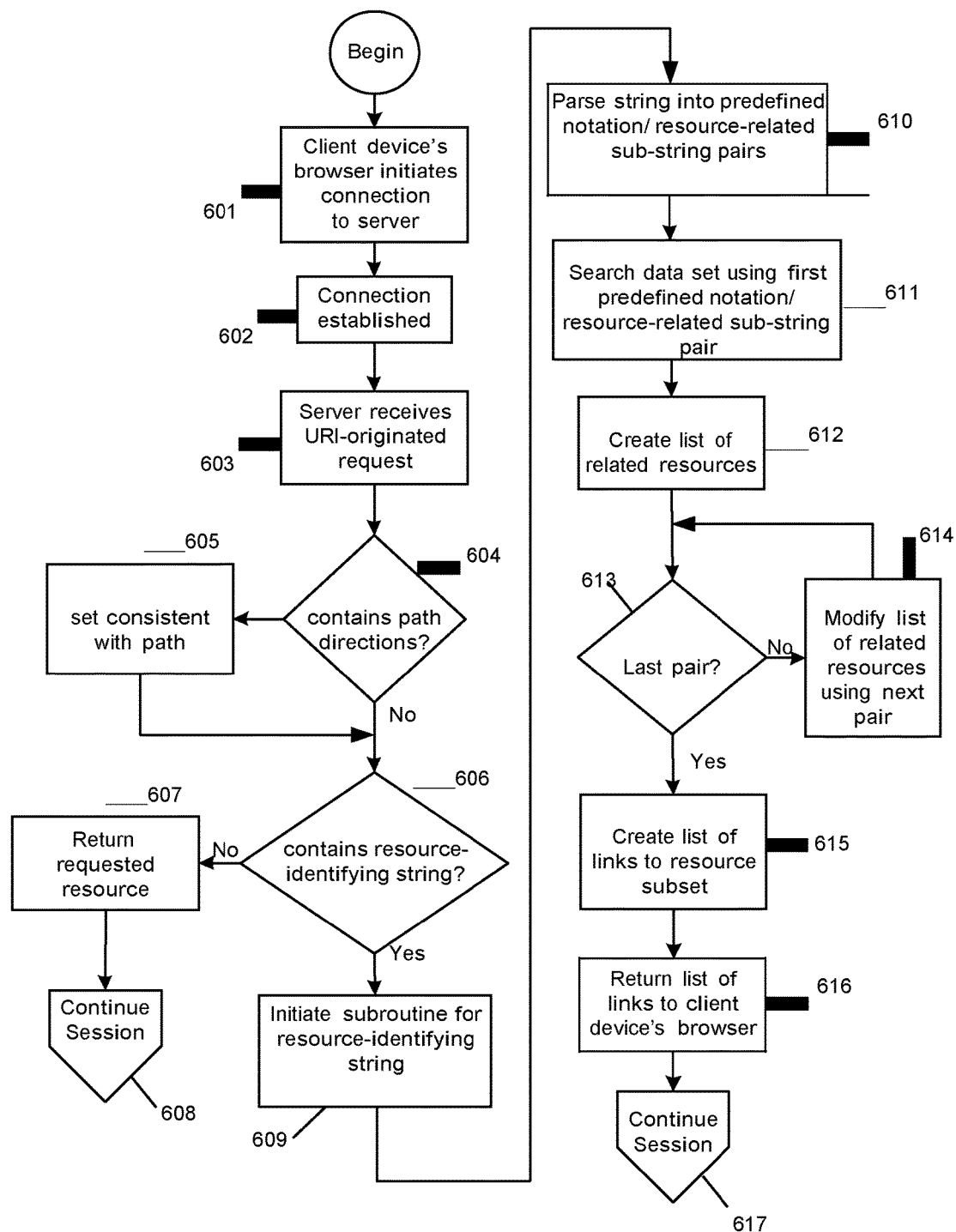
FIG. 6 is a schematic flowchart of a server-side process embodiment.

FIG. 6 is a schematic flowchart of a disclosed server-side process embodiment. The process begins 601 with initiating a connection between a remote client or browser and a server identified in the URI. When the connection is established 602, the server takes 603 the URI request for information and return. At 604, if the URI request contains a path component, the search processing 605 passes to the dataset at the end of the path. The URI is next further parsed 606 to see if it contains a resource-identifying string. If not, the requested document is simply fetched 607 and returned to the browser 608. If there is a resource-identifying string, then subroutine or associated program on the server for such purposes is initiated at 609 and the resource-identifying string parsed into predefined notation and resource-related sub-string pairs at 610, and the dataset is searched for matches for the first pair at 611, and list of matching results is created at 612. If there are no further pairs at 613, the results are used to create a list of links at 615 and that list is returned to the browser at 616 for display. If there is another pair, the results are modified in accordance with the logic and the content of the pair at 614, before the link list is returned to the browser.

Figure 7:
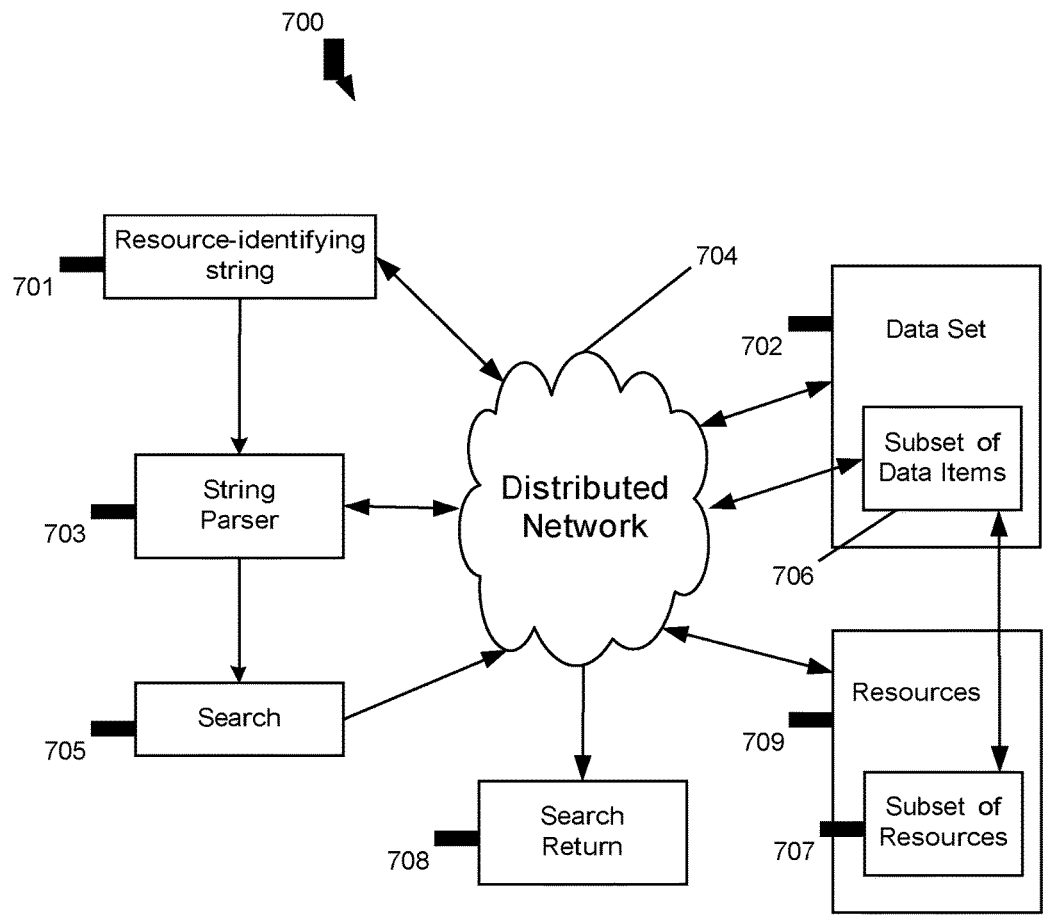
FIG. 7 schematically illustrates a generalized dataset query or search environment in which aspects of disclosed systems and methods are implemented.

In FIG. 7 schematic dataset environment 700 contains resource-identifying string 701 which is parsed by string parser 703 directly or across network 704 to generate search request 705. Request 705 is sent to dataset 702 which contains subset 706 of data items which meet the requirements of request 705 and which are less than all of the contents of dataset 702. Subset of data items 706 is related to subset of resources 707 in a set of resources 709. Subset of data items is used to generate a return search list 708 of the related subset of resources 709. Data items 706 are related to subset of resources 707 either by being linked to each other or one to the other, or by the subset of resources 707 directly containing some or all of the subset of data items 706, for instance in the form of document tags or headers or metadata or the like. Search 708 is returned.

Figure 8:
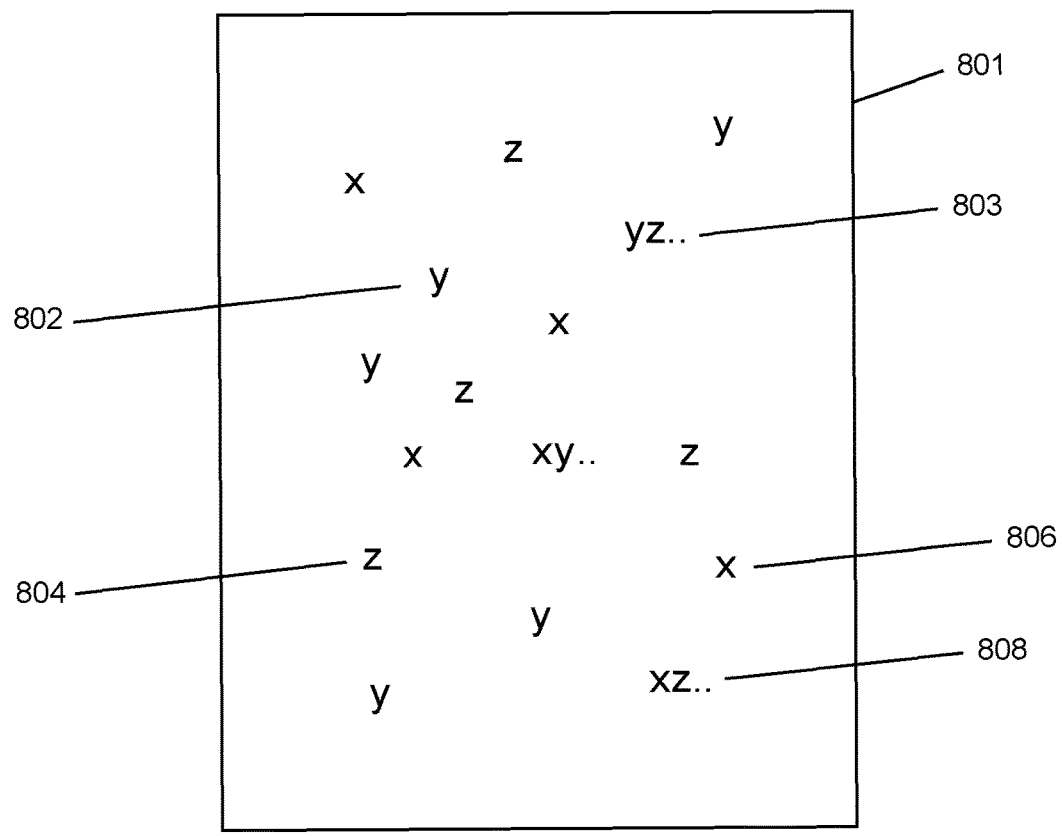
FIG. 8 is a schematic representation of data district data items within a dataset.

In FIG. 8 diverse data items Y 802, Z 804 and X 806 are shown schematically distributed within entire dataset 801. A request (such as initiated by the resources-identifying substring) to return data items Y 802 will return all Y's (and may also include all XYs and YZs, unless they are precluded by further predefined notation and resources-identifying sub-string pairs (such as ˆ ˆ X or ˆ ˆ Z) in the request. In like manner a search request for data items Z 804 or X 806 will respectively return all Z's or all X's (and or all YZs 803 and XZs 808).

The data item subset of X (also known herein as a data district) is less than all the data items in dataset 801. In like manner the subset of Y and the subset of Z are also less than all the data items in dataset 801. (Y and Z are also data districts.) Even combinations of X or Y or Z are less than all the data items in dataset 801.

Figure 9:
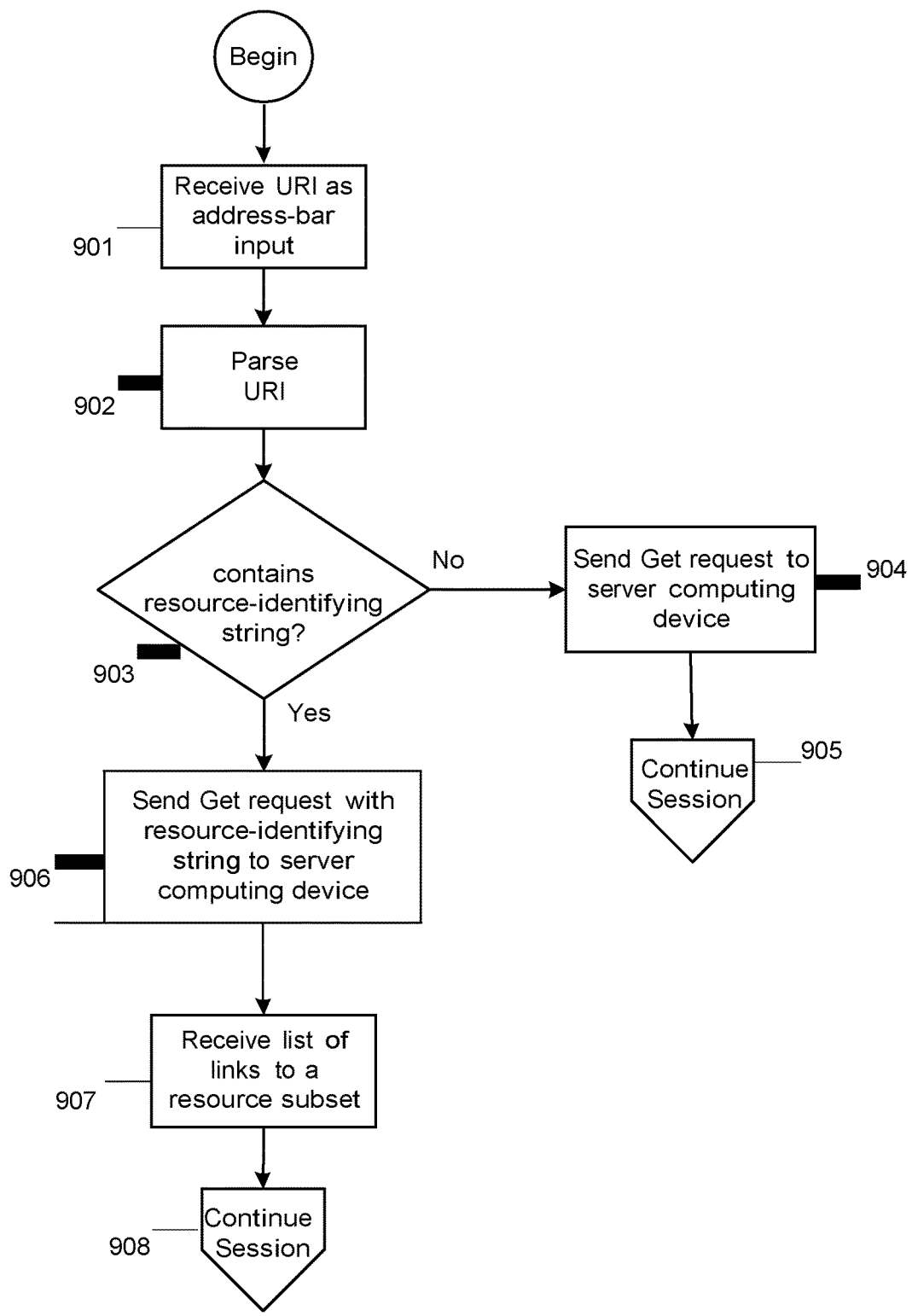
FIG. 9 is a schematic flowchart of a client-side process embodiment.

FIG. 9 is a schematic flowchart of a disclosed client-side process embodiment. The process begins with a client computing device receiving 901 at the address bar of a client browser a URI input. The URI is advantageously parsed 902 to see if it contains at 903 a resource-identifying string. If not, at 904, a conventional get request is sent to the domain specified by the URI and the session continues 905. If the URI does contain a resource-identifying string then at 906, a special get request with the resource-identifying string is sent to the particular domain specified in the URI. At 907 the return list of links from the get request is received by the client, and the session continues 908.

Having described and illustrated the principles of the disclosed subject matter with reference to illustrated embodiments, it will be recognized that the illustrated embodiments can be modified in arrangement and detail without departing from such principles. And, though the foregoing discussion has focused on particular embodiments, other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description is intended to be illustrative only, and should not be taken as limiting the scope of the invention. What is claimed therefore is all such modifications as may come within the scope and spirit of the following claims and equivalents thereto.

We claim:

1. A method for utilizing a distributed computer network during a connection session between a server computer, which contains a processor and memory, and a client computer to search for and retrieve a user specified grouping of data items in at least one data set residing in the memory of the server computer, said method comprising:
    a) generating at the client computer a Uniform Resource Identifier (URI) that is a string of characters used to locate and identify a specific resource on the server computer:
        i) wherein the URI comprises at least one symbolic logical operator and at least one associated text string that refers to a subset of data items to be searched within the at least one data set residing in the memory of the server computer; and
        ii) wherein the at least one associated text string was not created automatically either on the client computer or the server computer;
    b) transmitting of the URI by the client computer to the server computer;
    c) receiving the URI by the server computer;
    d) parsing the URI by the server computer to identify a domain hosted by the server computer wherein the domain has access to the at least one data set;
    e) parsing the at least one logical operator and the at least one associated text string by the server computer;
    f) executing a data search by the server computer of the at least one data set contained in a tagged server information resource in the domain identified in the URI, using the at least one logical operator operating on its at least one associated text string, said data search being formatted to a set of search parameters specified in the URI and appropriate to the at least one associated text string and to the at least one data set;
    g) locating a subset of data items residing in the at least one data set contained in the tagged server information resource in the domain identified in the URI, as text strings or string data elements, within the at least one dataset by the server computer according to the set of search parameters specified in the URI, by utilizing the parsed at least one logical operator and the at least one associated text string;
    h) retrieving the subset of data items from the at least one dataset located in the domain identified in the URI as text strings or string data elements by the server computer as part of the grouping of data items specified by the user in the URI;
    j) generating the grouping of data items specified by the user in the URI to consist of all the data items retrieved from the at least one data set according to the set of search parameters specified in the URI;
    k) transmitting the grouping of data items specified by the user in the URI as text strings or string data elements to the client computer over the distributed network; and
    l) receiving the grouping of data items specified by the user in the URI as text strings or string data elements by the client computer.

2. The method of claim 1 wherein the at least one logical operator comprised within the URI is a plurality of symbolic logical operators.

3. The method of claim 1 wherein the least one associated text string comprised within the URI that refers to a subset of data items to be searched within the data set residing in the memory of the server computer is a plurality of respectively associated text strings comprised within the URI.

4. The method of claim 1, 2, or 3 wherein the URI is input to an address bar component of a distributed network browser application running on the client computer and transmitted to the server computer.

5. The method of claim 1, 2, or 3 wherein the at least one logical operator precedes its at least one associated text string.

6. The method of claim 1, 2, or 3 wherein the at least one data set is selected from a group of data sets consisting of
    a database,
    a container,
    an array,
    a list,
    a stack,
    a queue,
    a tree,
    a graph,
    a map, and
    a hash.

7. The method of claim 1, 2, or 3 wherein the data items are searchable text strings contained within one or more documents included within the at least one data set, and wherein the one or more documents are selected from document types consisting of
    Adobe Acrobat PDF type documents,
    word processing type documents,
    HTML type documents, and
    XML type documents.

8. The method of claim 1, 2, or 3 wherein the URI is received by the server computer comprised within a Hypertext Transfer Protocol (HTTP) Get request.

9. The method of claim 1, 2, or 3 wherein the at least one symbolic logical operator is at least one occurrence of a text string being:
    the ˆ symbol as an ASCII decimal,
    the ˆ symbol as an ASCII hexadecimal,
    the ˆ symbol as an HTML number equivalent of the ˆ symbol.

10. The method of claim 9 wherein the at least one symbolic logical operator comprises a single occurrence of a logical symbol that is used by the processor of the server computer as a logical inclusive when retrieving the subset of data items from the data set.

11. The method of claim 9 wherein the at least one symbolic logical operator comprises a plurality of logical symbols.

12. The method of claim 9 wherein the at least one symbolic logical operator comprises a double occurrence of the logical symbol that is used by the processor as a logical exclusive when retrieving the subset of data items from the data set.

13. The method of claim 9 wherein the URI comprises a plurality of symbolic operators and a plurality of associated text strings such that each of the plurality of associated text strings is preceded by a symbolic operator.

\* \* \* \* \*